(12) United States Patent
Tamir et al.

(10) Patent No.: US 9,081,709 B2
(45) Date of Patent: *Jul. 14, 2015

(54) VIRTUALIZABLE AND FORWARD-COMPATIBLE HARDWARE-SOFTWARE INTERFACE

(71) Applicant: Intel Corporation, Santa Clara, CA (US)

(72) Inventors: Eliezer Tamir, Bait Shemesh (IL); Eliel Louzon, Jerusalem (IL); Ben-Zion Friedman, Jerusalem (IL); Miles J. Penner, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/258,966

(22) Filed: Apr. 22, 2014

(65) Prior Publication Data

US 2014/0229637 A1    Aug. 14, 2014

Related U.S. Application Data

(63) Continuation of application No. 13/192,406, filed on Jul. 27, 2011, now Pat. No. 8,719,843.

(51) Int. Cl.
   *G06F 3/00*          (2006.01)
   *G06F 13/10*        (2006.01)
   *G06F 9/44*         (2006.01)
   *G06F 9/46*         (2006.01)
   (Continued)

(52) U.S. Cl.
CPC ............ *G06F 13/105* (2013.01); *G06F 9/4411* (2013.01); *G06F 9/468* (2013.01); *G06F 9/545* (2013.01); *G06F 9/546* (2013.01); *G06F 2003/0697* (2013.01)

(58) Field of Classification Search
CPC .............................. G06F 13/102; G06F 9/4411
See application file for complete search history.

(56) References Cited

U.S. PATENT DOCUMENTS 5,561,815 A * 10/1996 Takata et al. ..................... 710/13
5,751,975 A * 5/1998 Gillespie et al. .............. 710/315
(Continued)

OTHER PUBLICATIONS

Himanshu Raj, High Performance and Scalable I/O Virtualization via Self-Virtualized Devices, Jun. 2007.*
(Continued)

*Primary Examiner* — Lechi Truong
(74) *Attorney, Agent, or Firm* — Mnemoglyphics, LLC; Lawrence M. Mennemeier

(57) ABSTRACT

Methods and apparatus are disclosed for virtualizable, forward-compatible hardware-software interfaces. Embodiments may be used in a driver whether it is a physical driver or a virtual driver. Commands are queued from the driver and fetched to the device. An actions table is accessed to determine if drivers are permitted to perform commands. Events are queued for the drivers responsive to commands. If drivers are not permitted to perform a command, device firmware may forward the command to a privileged driver to perform the required command. If a driver is only permitted to perform a command with assistance the command is forwarded for corrections and execution. If a command is to be dropped, a completion event may be queued as if the command had executed. Drivers may have no indication of which actions were taken. The actions table may be changed for hardware/software modifications or dynamically according to configuration changes.

17 Claims, 7 Drawing Sheets

(51) Int. Cl.
*G06F 9/54* (2006.01)
*G06F 3/06* (2006.01)

(56) References Cited

U.S. PATENT DOCUMENTS

| | | | |
|---|---|---|---|
| 6,032,217 A | 2/2000 | Arnott | |
| 6,434,630 B1* | 8/2002 | Micalizzi et al. | 710/5 |
| 7,082,598 B1* | 7/2006 | Le et al. | 717/127 |
| 7,334,107 B2 | 2/2008 | Schoinas et al. | |
| 7,886,295 B2 | 2/2011 | Burger et al. | |
| 8,166,211 B2* | 4/2012 | Cota-Robles et al. | 710/15 |
| 2004/0015622 A1 | 1/2004 | Avery | |
| 2007/0073916 A1* | 3/2007 | Rothman et al. | 710/14 |
| 2007/0260775 A1 | 11/2007 | Bita et al. | |
| 2010/0082854 A1 | 4/2010 | Resen et al. | |
| 2010/0287310 A1 | 11/2010 | Jung et al. | |
| 2011/0107347 A1 | 5/2011 | Raisch et al. | |
| 2012/0151472 A1 | 6/2012 | Koch et al. | |
| 2012/0254982 A1 | 10/2012 | Sallam | |

OTHER PUBLICATIONS

PCI Express Base Specification Revision 3.0, PCI Express, Nov. 10, 2010, 860 pages.
Neil, Mike, Product Unit Manager—Windows Virtualization, "Hypervisor, Virtualization Stack, and Device Virtualization Architectures," Microsoft Corporation WinHEC 2006; Seattle, Washington, May 23, 2006, 6 pages.
Network Controller Sideband Interface (NC-SI) Specification Version 1.0.0, Document No. DSP0222, Distributed Management Task Force, Inc.; Jul. 21, 2009, 122 pages.
Management Component Transport Protocol (MCTP) Base Specification—Includes MCTP Control Command Specifications, Version 1.1.0, Document No. DSP0236, Distributed Management Task Force, Inc.; Apr. 22, 2010, 82 pages.
Shah, Amit et al., "PCI Device Passthrough for KVM," KVM Forum 2008; Jun. 11-13, 2008, 22 pages.
Chien-Hua Yen, ISV Engineering, "Solaris Operating System Hardware Virtualization Product Architecture," Sun BluePrints On-Line—Nov. 2007, Part No. 820-3703-10, Revision 1.0; Nov. 27, 2007, 120 pages.
High Availability Solution for WebSphere Message Queue in a Single Instance Queue Manager Configuration Using HAE and a Shared DASD Device, Part No. ZSW03187-USEN-00, IBM Systems and Technology Group, Somers, New York, Apr. 2011, 33 pages.
Robert W. Horst, TNet: A Reliable System Area Network 1995.
Notification of Transmittal of the International Search Report and the Written Opinion of the International Searching Authority, or the Declaration; Jan. 28, 2013, Korean Intellectual Property Office, Daejeon Metropolitan City, Republic of Korea, 7 pages.
Hughes, Blade Center Processor Blades, I/O Expansion Adapters and Units, Oct. 2005.
International Search Report of the International Searching Authority, PCT/US2012/048121, Mailed Jan. 28, 2013, Korean Intellectual Property Office, Republic of Korea, 3 pages.
Written Opinion of the International Searching Authority, PCT/US2012/048121, Mailed Jan. 28, 2013, Korean Intellectual Property Office, Republic of Korea, 4 pages.
International Preliminary Report on Patentability, PCT/US2012/048121, Mailed Feb. 6, 2014, The International Bureau of WIPO; Geneva, Switzerland, 6 pages.

* cited by examiner

VIRTUALIZABLE AND FORWARD-COMPATIBLE HARDWARE-SOFTWARE INTERFACE

RELATED APPLICATIONS

This is a Continuation of application Ser. No. 13/192,406, filed Jul. 27, 2011, now U.S. Pat. No. 8,719,843.

FIELD OF THE DISCLOSURE

This disclosure relates generally to the fields of computing and/or communications. In particular, the disclosure relates to virtualizable and forward-compatible device driver interfaces.

BACKGROUND OF THE DISCLOSURE

Busses or communications subsystems include both electrical/electro-magnetic interfaces and programming interfaces. Devices that comply with a particular bus's interfaces include hardware, firmware and software combinations along with state and/or data storage for configuration purposes and communication of control signals and/or data, typically with a device driver written specifically for the device and complying with the bus's software interface to provide a host machine with control of, and access to the device. The device drivers may be identified with one or more of a particular device ID (identifier) and version, a vendor ID, a sub-vendor ID and a sub-device ID. A (Peripheral Component Interconnect) PCI Express® Base Specification, Rev. 3.0, section 7.5.1, is available online at pcisig.com/members/downloads/specifications/pciexpress/ in PDF (portable document format) format as PCI_Express_Base_r3.0__10Nov10.pdf for additional information.

Forward compatibility or upward compatibility in the context of this disclosure is the ability of a hardware-software interface or system to work gracefully with later versions of itself or newer devices that are not yet designed. A forward compatible technology implies that an interface designed for older devices can function as expected with new devices.

Virtualization in the context of this disclosure refers to virtualized device drivers, virtualized hardware devices, or virtual functions. For example, it may be that several Ethernet devices share a single physical link through virtualized interfaces. Thus, a virtualization technology may provide a mechanism of presenting a set of logical computing and/or communication resources over a hardware configuration so that these logical resources can be accessed in the same manner as the original hardware configuration. Hardware resources that can be virtualized may include computer systems, storage, networks, cryptographic resources, graphics resources, audio resources, television resources or others.

Examples of hardware virtualization technology include the KVM (Kernel-based Virtual Machine) for Linux based systems; Hypervisors, VSPs (Virtualization Service Providers), VSCs (Virtualization Service Clients) and VM (Virtual Machine) worker processes for Windows® based systems; the Xen hypervisor for Windows and Linux based virtual servers; and System z virtualization for systems based on IBM's z/OS (Operating System), z/VSE (Virtual Storage Extended) or z/TPF (Transaction Processing Facility), Linux on System z, and for the z/VM hypervisor. Some of these technologies may employ messaging techniques such as sockets, switches, message channels and mail-boxes which may permit virtual drivers that are aware of the virtualization, or some may require extensive infrastructures, hypervisors, and/or emulators. As such, prior art techniques may not provide enough flexibility to design virtualized device drivers, virtualized hardware devices, or virtual functions with an interface, that while designed for current devices, can function as expected with new devices as they become available.

To date, potential solutions to such virtualizable and forward-compatible device hardware-software interfaces have not been adequately explored.

BRIEF DESCRIPTION OF THE DRAWINGS

The present invention is illustrated by way of example and not limitation in the figures of the accompanying drawings.

DETAILED DESCRIPTION

Methods and apparatus are disclosed for a virtualizable and forward-compatible hardware-software interface. Embodiments of device interfaces may be used in a device function driver regardless of whether it is a physical driver or a virtual driver. Commands may be queued from the driver into a command queue and subsequently fetched from the command queue by device firmware. An actions table may be accessed by firmware to determine if drivers are permitted to perform the various commands. In some embodiments, it may be desirable that such permissions be dynamically modifiable according to system events or changes.

Events are queued from firmware into the respective event queues for the drivers responsive to the commands. If a virtual driver is not permitted to perform a particular command, device firmware may forward the command to an event queue or a command queue for a physical driver or a privileged driver or to a hypervisor or VMM (Virtual Machine Manager) to perform or proxy the required command on behalf of the virtual driver. If a driver is only permitted to perform an issued command with assistance, firmware may trap the command, forward the command to a privileged driver and/or make any necessary corrections to parameters etc., so as to then execute the corrected command on behalf of the issuing driver. The actions table may also be changed or adjusted for hardware and software modifications or updated dynamically according to configuration changes in order to adjust permissions for various commands and driver types.

Figure 1:
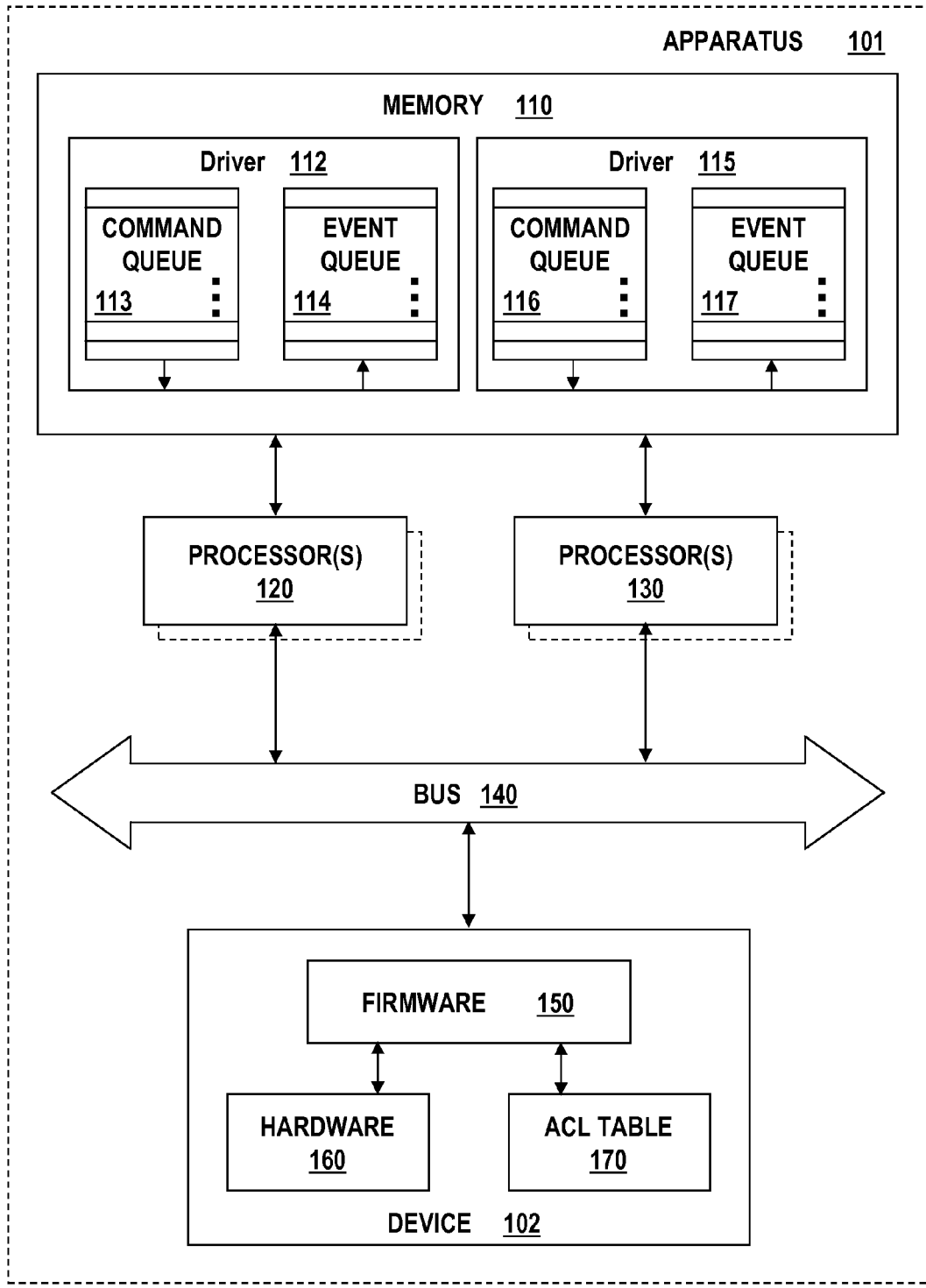
FIG. 1 illustrates one embodiment of an apparatus to implement a virtualizable and forward-compatible device-driver/function-driver interface with a combined hardware firmware device.

FIG. 1 illustrates one embodiment of an apparatus 101 to implement a virtualizable and forward-compatible device-driver/function-driver interface with a combined hardware firmware device 102.

Some embodiments of apparatus 101 may adhere to industry virtualization standards which allow multiple operating systems running simultaneously within a single computer to natively share devices. For example, SRIOV (Single Root I/O Virtualization) provides native I/O virtualization in existing (Peripheral Component Interconnect) PCI Express® topologies where there is a single root complex. Similarly, MRIOV (Multiple Root I/O Virtualization) provides native I/O virtualization in new topologies (such as blade servers) where multiple root complexes share a PCI Express hierarchy.

Other embodiments of apparatus 101 may be implemented using standard or non-standard or proprietary virtualization technologies, interfaces, busses or interconnects—for example, the SPI (Serial Peripheral Interface) bus; the ISA (Industry Standard Architecture) bus, PC/104, PC/104+ and Extended ISA; USB (Universal Serial Bus) AVC (Audio Video Class); AMBA (Advanced Microcontroller Bus Architecture) (Advanced Peripheral Bus) APB; FireWire (*IEEE Std 1394a-2000 High Performance Serial Bus—Amendment* 1, ISBN 0-7381-1958-X; *IEEE Std 1394b-2002 High Performance Serial Bus—Amendment* 2, ISBN 0-7381-3253-5; *IEEE Std* 1394c-2006, 2007-06-08, ISBN 0-7381-5237-4); HDMI (High-Definition Multimedia Interface); the VESA's (Video Electronic Standards Association) DisplayPort and Mini DisplayPort; the MIPI® (Mobile Industry Processor Interface) Alliance's SLIMbus® (Serial Low-power Interchip Media Bus), LLI (Low Latency Interface), CSI (Camera Serial Interface) DSI (Display Serial Interface), etc.

Apparatus 101 includes memory 110 to record functional descriptive material including executable instructions of driver 112 and driver 115, which may be executed by logical processor(s) 120 or by logical processor(s) 130. Driver 112 and driver 115 may be function drivers which provide specific functions to a device driver for device 102. Driver 112 and driver 115 may be physical drivers or virtualized drivers or both. In one embodiment of apparatus 101, one of driver 112 or driver 115 may be considered a privileged driver (without loss of generality, say driver 115). If the executable instructions of driver 112 and/or of driver 115 are executed by logical processor(s) 120 or by logical processor(s) 130 they may cause apparatus 101 to perform one or more processes to implement a virtualizable and forward-compatible device-driver/function-driver interface with combined hardware firmware device 102.

In some embodiments combined hardware firmware device 102 may be included in a network interface card (NIC). Combined hardware firmware device 102 includes firmware 150, hardware 160 and an access control list, ACL table 170. Firmware 150 records functional descriptive material including executable state-machine instructions for device 102, which may cause device 102 to perform one or more processes to implement a virtualizable and forward-compatible device-driver/function-driver interface within apparatus 101. Bus 140 includes both electrical/electro-magnetic interfaces and programming interfaces. Device 102 complies with bus 140's interfaces include hardware 160, firmware 150 and software drivers 112 and 115 along with state and/or data storage for configuration purposes and communication of control signals and/or data, with device 102 drivers 112 and 115 written specifically for device 102 or for an earlier version of device 102, and complying with bus 140's software interface to provide apparatus 101 with control of, and access to device 102.

Embodiments of one or more processes to implement a virtualizable and forward-compatible device-driver/function-driver interface within apparatus 101 will also be described in greater detail below, in particular with reference to FIGS. 2-4. But as an example of one embodiment of such a process to implement a virtualizable and forward-compatible device-driver/function-driver interface within apparatus 101, firmware 150 may fetch a command from command queue 113 of driver 112. Firmware 150 may then access ACL table 170 to determine if function driver 112 is permitted to perform the fetched command. An example of one embodiment of ACL table 170 is illustrated as Table 1. Based on the sender of a command, a command could be allowed, or filtered, or denied, or dropped, or trapped and forwarded to another driver or to a hypervisor, etc.

TABLE 1

Example ACL Table showing actions for virtual functions (VF), privileged functions (PF), network control and management (MNG).

| Command | ... | VF Action | PF Action | Network Action | MNG Action |
|---|---|---|---|---|---|
| Get Var | | allow | allow | drop | allow |
| Reg Read | | filter by address | allow | drop | allow |
| Reg Write | | filter by address | allow | drop | allow |
| . | | | | | |
| . | | | | | |
| . | | | | | |

If driver 112 is permitted to perform the command, hardware 160 and/or firmware 150 may execute the command, and firmware 150 may queue an event into event queue 114 of driver 112 responsive to completion of the command.

If, on the other hand, accessing of ACL table 170 by firmware 150 determines that driver 112 is not permitted to perform the command, firmware 150 may forward the command, as an event, to event queue 117 (or to command queue 116) for driver 115, which for the sake of this example, we may assume is privileged. In that case, driver 115 receives an event from firmware 150 via event queue 117, the event corresponding to a command forwarded from a virtual driver, driver 112, by device 102's firmware 150. Driver 115 may then queue a second command or commands into command queue 116 responsive to receiving the event in event queue 117. Subsequently, firmware 150 fetches the second command or commands from command queue 116 from driver 115, and accesses ACL table 170 to determine if driver 115 is permitted to perform the second command or commands, which again assuming driver 115 is privileged, performing the second command or commands is permitted. The second command or commands may then be executed by hardware 160 and/or firmware 150, and firmware 150 may queue an event or events into event queue 117 of driver 115 responsive to completion of the second command or commands. Driver 115 receives another event from firmware 150 via event queue 117, the event corresponding to completion of the second command or commands. Driver 115 may then queue a third command into command queue 116 responsive to receiving the event or events in event queue 117, this command to simulate a completion of the first command from driver 112 by sending a completion event to event queue 114.

The third command may then be executed by hardware 160 and/or firmware 150, and firmware 150 may queue a simulated completion event into event queue 114 of driver 112 simulating completion of the first command in response to execution of the third command, and may queue a completion event into event queue 117 of driver 115 responsive to actual completion of the third command.

Thus the entire driver 112 may be virtualized without making any changes to driver 112, or it may be virtualized function by function, or it may be virtualized device feature by device feature, or it may even be virtualized command by command, through changing permissions in ACL table 170. It will be appreciated that such fine-grained virtualization may be utilized to reduce operating costs, or to optimize services, or to provide driver 112 with forward compatibility, or to fix bugs in device 102, and that such fine-grained virtualization may be applied at the design time of device 102, or may be applied dynamically at run time without modification to driver 112. It will be appreciated that a similar process may be used in response to receiving commands via a manageability interface or from the network via control packets.

Figure 2:
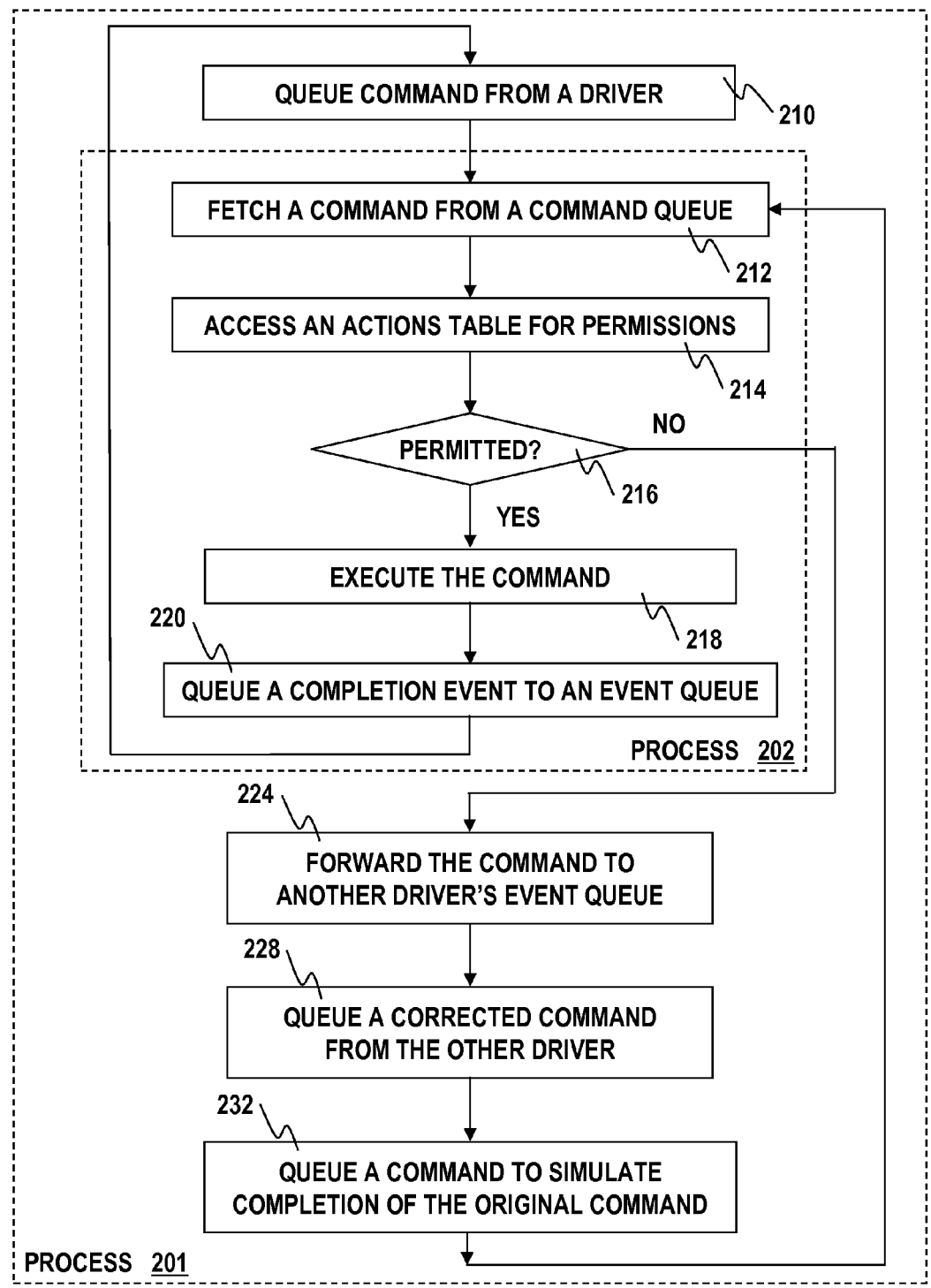
FIG. 2 illustrates a flow diagram for one embodiment of a process to utilize a virtualizable and forward-compatible device-driver/function-driver interface with a combined hardware firmware device.

FIG. 2 illustrates a flow diagram for one embodiment of a process 201 to utilize a virtualizable and forward-compatible device-driver/function-driver interface with a combined hardware firmware device. Process 201 and other processes herein disclosed are performed by processing blocks that may comprise dedicated hardware or software or firmware operation codes executable by general purpose machines or by special purpose machines or by a combination of both.

In processing block 210 of process 201 a plurality of commands may be queued from driver into a command queue. In some embodiments of process 201, commands may actually be queued from multiple virtualized, or partially virtualized, or physical drivers into multiple command queues all at the same time. For the sake of a sequential illustration of process 201 we may say, at the beginning, that the commands may be queued from a first driver into a first command queue. This first driver may be a function driver, for example of a particular function of a PCI device on a PCI Express bus or on a mini-PCI Express bus. In other embodiments the first driver may be compliant with some other standard or non-standard or proprietary bus's interfaces or communication channel's interfaces or other SW/HW interfaces for configuration purposes and for communication of control signals and/or data, between devices and device drivers to provide an apparatus such as apparatus 101 with control of, and access to a particular device.

In processing block 212 of process 202, a first command of the plurality of commands is fetched from the first command queue to a device firmware. Process 202 is a sub-process of process 201 and may represent a process that runs on the device firmware and/or hardware or software on the device. In processing block 214, an actions table is accessed with the device firmware to determine, in processing block 216, if the first function driver is permitted to perform the first command.

If the first function driver is permitted to perform the first command, then processing resumes in processing block 218 of process 202 where the command is executed by the device hardware and/or optionally with the help of the device firmware. Then in processing block 220, a completion event is queued into an event queue—in the context of this example, an event queue for the first driver. Processing then reiterates in process 201 beginning with processing block 210.

On the other hand, if the first function driver is not permitted to perform the first command, then processing proceeds instead from processing block 216 to processing block 224 of process 201 where the command is forwarded to another driver's event queue. In processing block 228, responsive to the forwarded command, a corrected command is queued from the other driver. The corrected command could, for example, have been corrected by the other driver replacing virtualized addresses in the forwarded command with physical addresses, by replacing an obsolete command of an older device with a newer functionally equivalent command, or by some other correction.

It will be appreciated that for the sake of illustration, in some embodiments of process 201, the other driver responds to a forwarded command by queuing a corrected command in accordance with processing block 228, but the invention is not so limited. It will also be appreciated that while processing blocks of process 201 and/or of process 202, may be shown as occurring in a particular sequence, such particular sequential order is not necessarily required or even expected to always be the same. For example, it will be appreciated that between the queuing of a corrected command in processing block 228, and proceeding to processing block 232, some of the processing blocks of, or one or more entire iterations of process 202 may have occurred.

This being understood, processing in process 201 proceeds to processing block 232 where a command is queued to simulate completion of the originally forwarded command. Processing then reiterates in process 202 beginning with processing block 221.

Figure 3A:
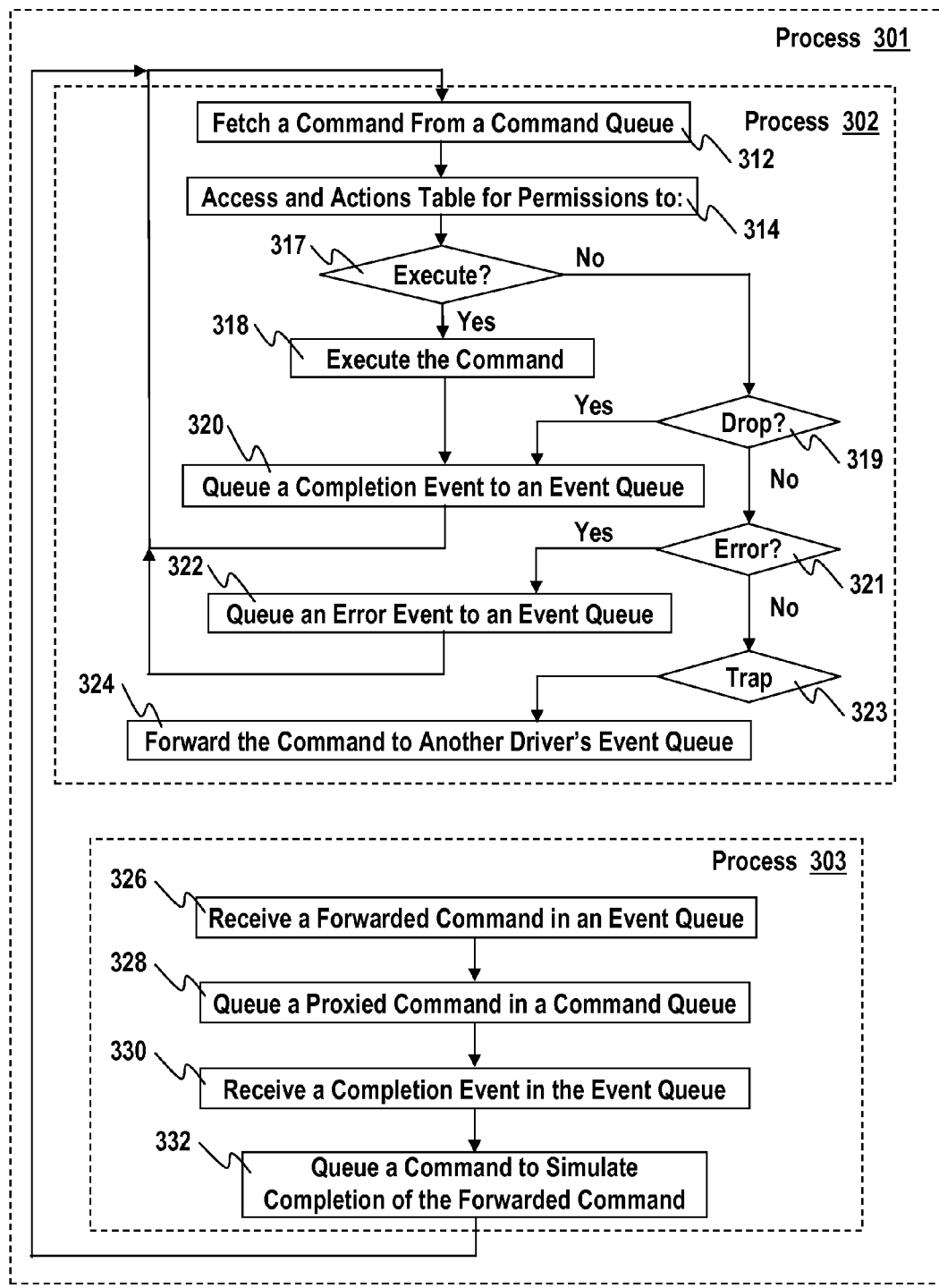
FIGS. 3a and 3b illustrate flow diagrams for alternative embodiments of a process to utilize a virtualizable and forward-compatible device-driver/function-driver interface with a combined hardware firmware device.

FIG. 3a illustrates a flow diagram for an alternative embodiment of a process 301 to utilize a virtualizable and forward-compatible device-driver/function-driver interface with a combined hardware firmware device. In processing block 312 of process 302, a first command is fetched from a first command queue to a device firmware. Process 302 is a sub-process of process 301 and as in process 202, process 302 may represent a process that runs on the device firmware and/or hardware or software on the device. In processing block 314, an actions table is accessed with the device firmware to determine, in processing block 317, if the command may be executed for the driver that queued the first command.

If it is permitted to execute the first command for the driver that queued it, then processing resumes in processing block 318 of process 302 where the command is executed by the device hardware and/or optionally with the help of the device firmware.

Alternatively, if execution of the first command for the driver that queued it is not permitted, and when the actions table is accessed it is determined, in processing block 319, that the command should be dropped; or otherwise upon a successful execution of the command in processing block 318; then in processing block 320, a completion event is queued into an event queue for the driver that queued the first command. In the case of the first command being dropped, no other action would be necessary. Processing then reiterates in process 302 beginning with processing block 312.

Otherwise, when the actions table is accessed in processing block 314, if it is determined, in processing block 321, that an error should be returned in response to the command, then in processing block 322, an error event is queued into an event queue for the driver that queued the first command, and processing reiterates in process 302 beginning with processing block 312.

Finally, when the actions table is accessed in processing block 314, if it is determined, in processing block 323, that the command should be trapped, then in processing block 324, the command is queued into an event queue for another driver, a privileged driver, and processing proceeds to process 303 beginning with processing block 326 where the forwarded command is received in the event queue of the privileged driver. Then in processing block 328 a proxied command is queued in a command queue of the privileged driver, and subsequently a completion event is received in the event queue of the privileged driver in processing block 330.

Accordingly, in processing block 332, a command to simulate completion of the forwarded command is queued in a command queue of the privileged driver, and processing reiterates in process 302 beginning with processing block 312.

Again, it will be appreciated that while processing blocks of process 301 and/or of process 303 or process 302, may be shown as occurring in a particular sequence, such particular sequential order is not necessarily required or even expected to always be the same. For example, it will be appreciated that between the queuing of a proxied command in processing block 328, and proceeding to processing block 330, some processing for the processing blocks of process 302, or one or more entire iterations of process 302 may have occurred. It will also be appreciated that a similar process or processes may be used in response to receiving commands via a manageability interface or from the network via control packets.

Figure 3B:
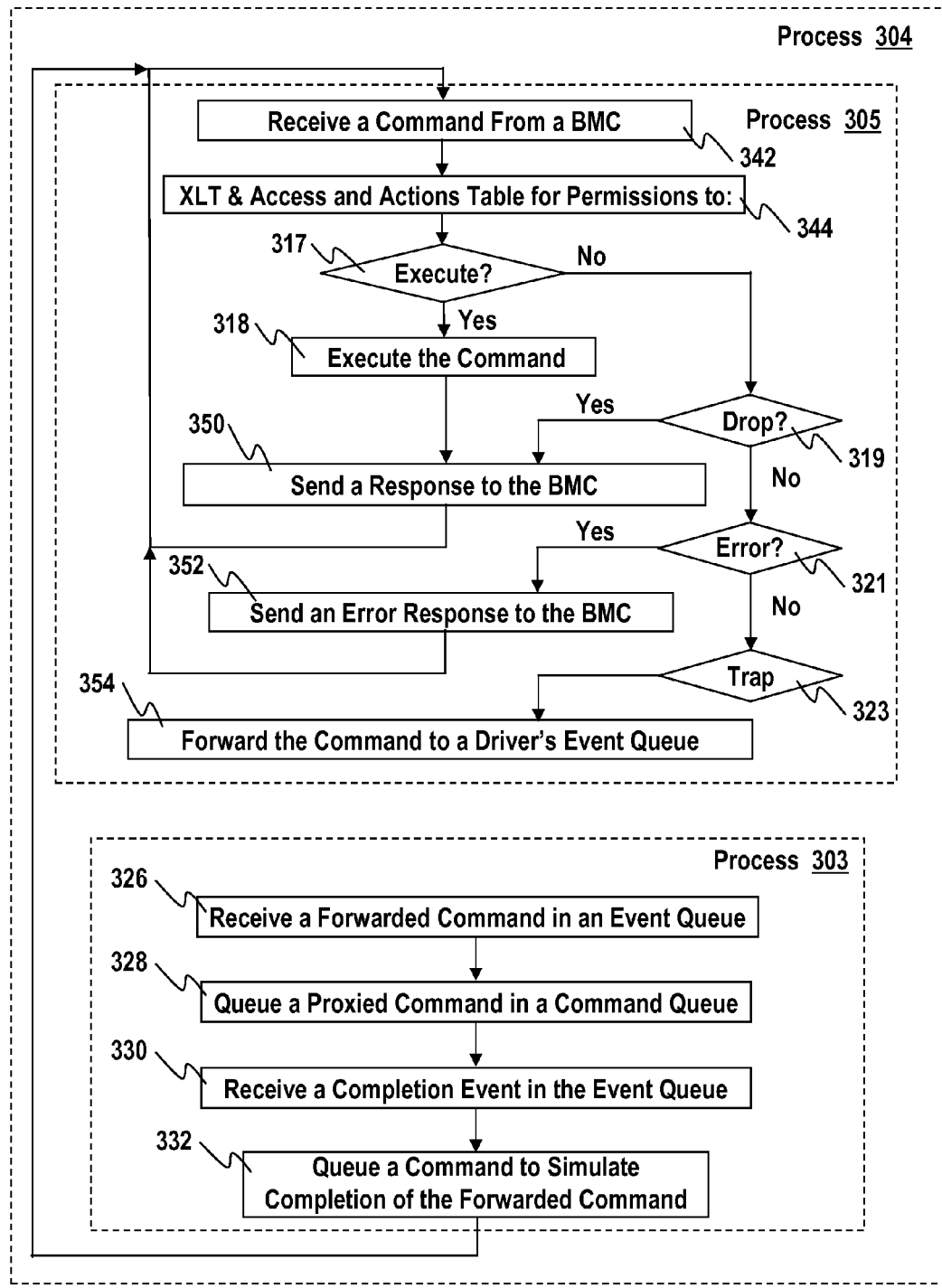

FIG. 3b illustrates a flow diagram for another alternative embodiment of a process 304 to utilize a virtualizable and forward-compatible device-driver/function-driver interface with a combined hardware firmware device. In processing block 342 of process 305, a first command is received from a Board Management Controller (BMC) by device firmware via a manageability interface. Process 305 is a sub-process of process 304 and as in process 302, process 305 may represent a process that runs on the device firmware and/or hardware or software on the device. In processing block 344, the first command may optionally be translated to an equivalent admin first command by firmware and an actions table is accessed with the device firmware to determine, in processing block 317, if the command may be executed for the BMC.

If it is permitted to execute the first command for the BMC, then processing resumes in processing block 318 of process 305 where the command is executed by the device hardware and/or optionally with the help of the device firmware.

Alternatively, if execution of the first command for the BMC is not permitted, and when the actions table is accessed it is determined, in processing block 319, that the command should be dropped; or otherwise upon a successful execution of the command in processing block 318; then in processing block 350, a response is sent to the BMC signaling completion of the first command. In the case of the first command being dropped, no other action would be necessary. Processing then reiterates in process 305 beginning with processing block 342.

Otherwise, when the actions table is accessed in processing block 344, if it is determined, in processing block 321, that an error should be returned in response to the command, then in processing block 352, an response is sent to the BMC signaling and error for the first command, and processing reiterates in process 305 beginning with processing block 342.

Finally, when the actions table is accessed in processing block 344, if it is determined, in processing block 323, that the command should be trapped, then in processing block 354, the command is queued into an event queue (or in a command queue) for a dedicated driver for completion, and processing proceeds to process 303 in a manner similar to that described above with regard to FIG. 3a. Thus a similar process or processes may be used in response to receiving commands via a manageability interface or from the network via control packets.

Figure 4:
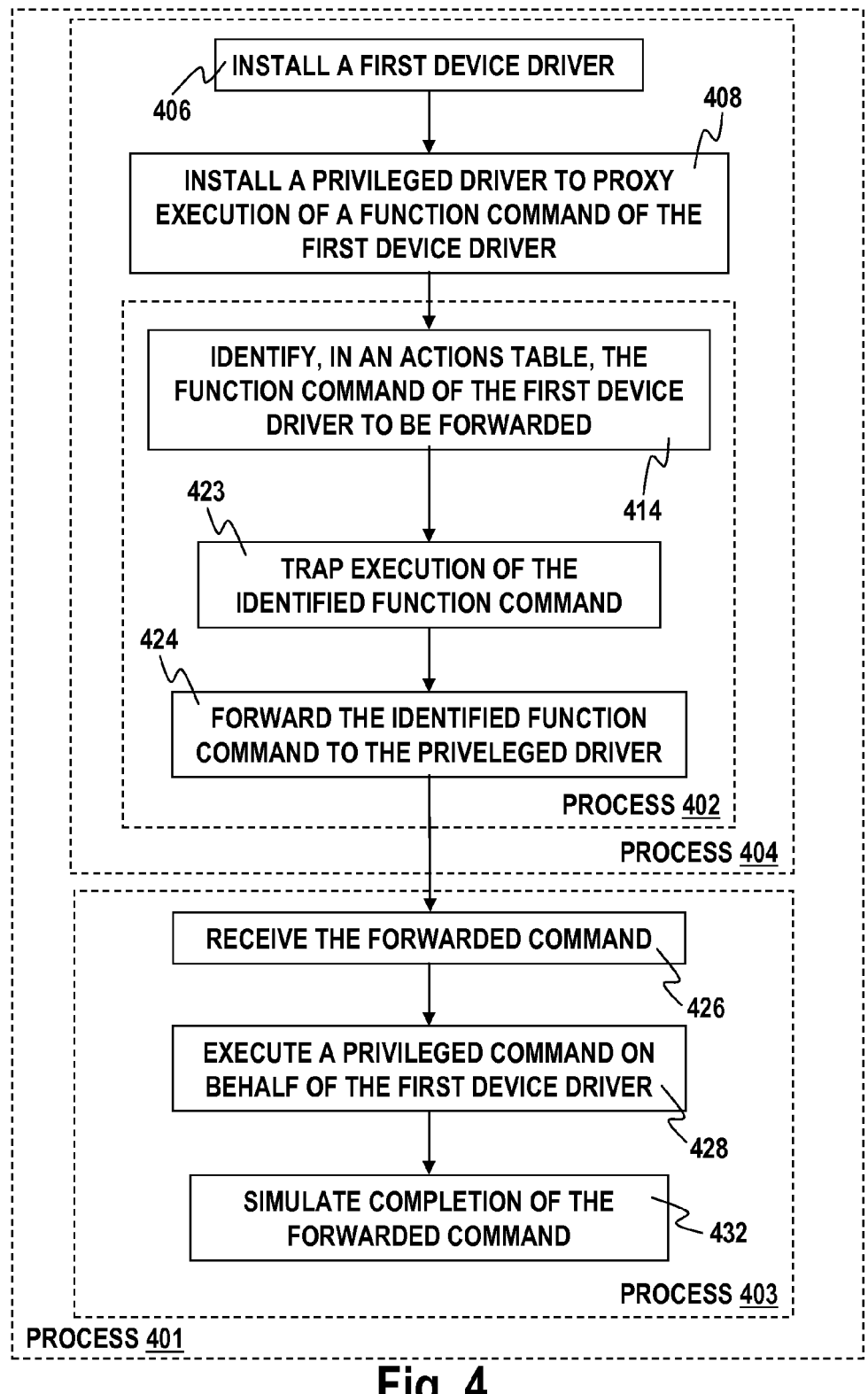
FIG. 4 illustrates a flow diagram for an alternative embodiment of a process to utilize a virtualizable and forward-compatible device-driver/function-driver interface with a combined hardware firmware device.

FIG. 4 illustrates a flow diagram for an alternative embodiment of a process 401 to utilize a virtualizable and forward-compatible device-driver/function-driver interface with a combined hardware firmware device. In processing block 406 of process 404, a first device driver is installed. In processing block 408, a privileged driver is installed to proxy execution of a function command of the first device driver. Then processing continues in processing block 414 of process 402, where the function command of the first driver is identified in an actions table so as to be forwarded. Subsequently in processing block 423, execution of the identified function command is trapped, and in processing block 424, the identified function command is forwarded to the privileged driver.

In processing block 426 of process 403, the forwarded command is received. Then in processing block 428 a privileged command is executed on behalf of the first device driver, and in processing block 432 completion of the forwarded command is simulated.

Thus drivers may be virtualized without making changes to the drivers themselves. Alternatively drivers may be virtualized function by function, or device feature by device feature, or command by command, through changing permissions in an ACL table on the device. It will be appreciated that such fine-grained virtualization may be utilized to reduce operating costs, or to optimize services, or to provide drivers with forward compatibility, or to fix bugs in a device, and that such fine-grained virtualization may be applied at the design time of devices, or may be applied dynamically at run time without modification to the drivers.

Figure 5:
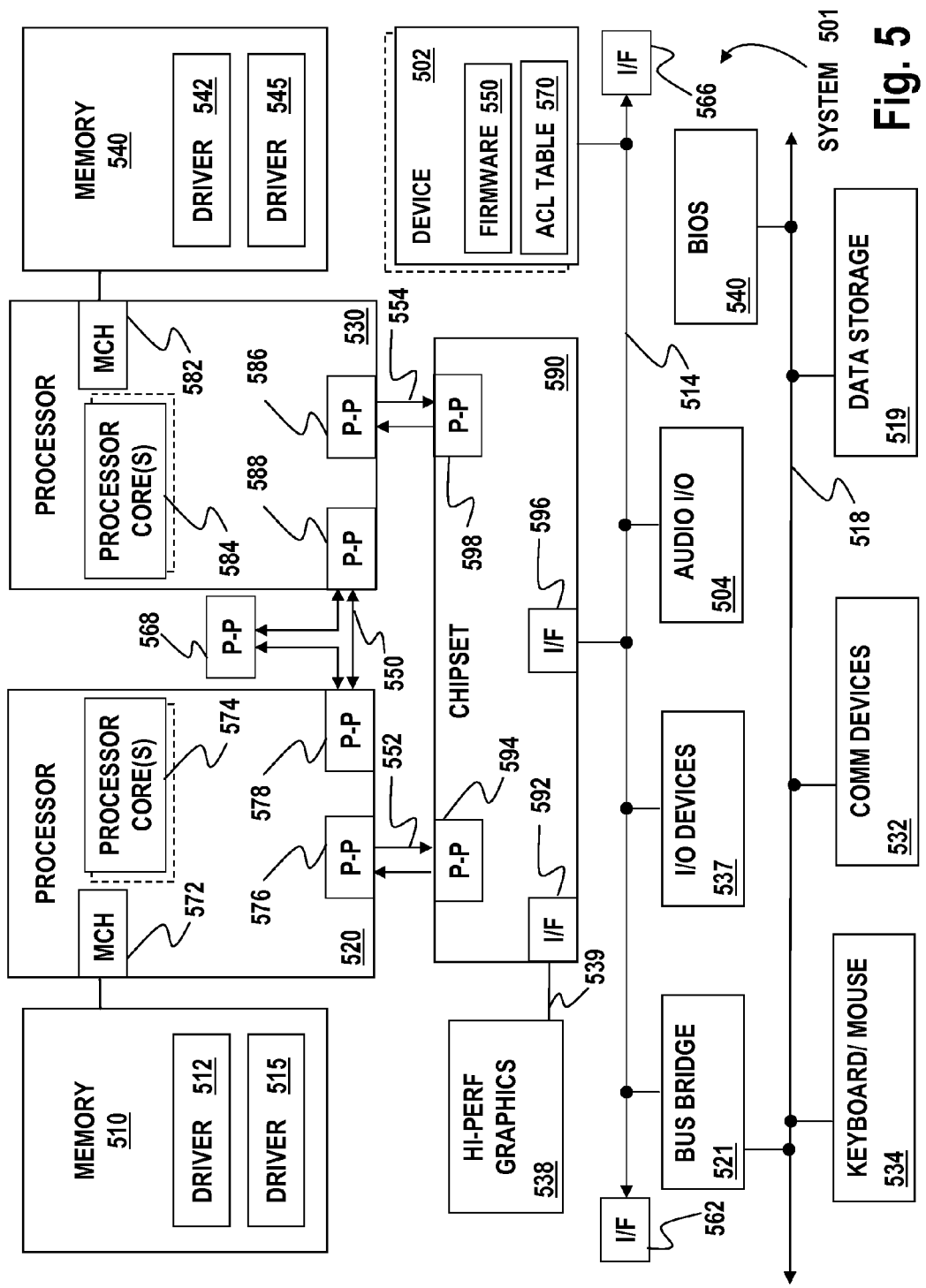
FIG. 5 illustrates one embodiment of a system that utilizes a virtualizable and forward-compatible device-driver/function-driver interface with a combined hardware firmware device.

FIG. 5 illustrates one embodiment of a data processing system 501 that utilizes a virtualizable forward-compatible device-driver/function-driver interface with a combined hardware firmware device. Data processing system 501 comprises processors 520 and 530 having one or more processing core(s) 574 and 584 respectively, memories 510 and 540, chipset 590, and device(s) 502, which includes firmware 550 and ACL table 570. For one embodiment of data processing system 501, processors 520 and 530 and chipset 590 may implement a P2P (point-to-point) interconnect system or a ring interconnect system for communication with each other and with device 502. The P2P system shown, for example, may actually include several processors, of which only the two, processors 520 and 530 are shown. Processors 520 and 530 may exchange data via P2P interface 550 using P2P interface circuits 578 and 588, and optionally with P2P interface 568, which in some embodiments may be a QuickPath Interconnect (QPI) expansion connector. Processors 520 and 530 may each exchange data with a chipset 590 via individual P2P interfaces 552 and 554 using point to point interface circuits 576, 594, 586 and 598.

Processors 520 and 530 may include a local MCH (memory controller hub) 572 and 582 to connect with memories 510 and 540 respectively. Memories 510 and 540 record functional descriptive material including executable instructions of driver 512 and driver 515, and of driver 542 and driver 545 respectively, which may be executed by processor 520 or by processor 530.

In some embodiments device(s) 502 may include, or be included as part of a NIC. Drivers 512, 515, 542 and 545 may be function drivers which provide specific functions to a device driver for device(s) 502. Driver 512, 515, 542 and 545 may be physical drivers or virtualized drivers or some of both. In one embodiment of system 501, one of driver 512 or driver 515 and one of driver 542 or driver 545 may be considered a privileged driver (without loss of generality, say drivers 515 and 545). If the executable instructions of driver 512, of driver 515, of driver 542 and/or of driver 545 are executed by processor 520 or by processor 530 they may cause the system 501 to perform one or more processes to implement a virtualizable and forward-compatible device-driver/function-driver interface with combined hardware firmware device 502.

Chipset 590 may also exchange data with a high-performance graphics circuit 538 via a high-performance graphics interface 539. In one embodiment, any processor core may include or otherwise be associated with a local cache memory (not shown). Furthermore, a shared cache (not shown) may be included in either processor or outside of both processors, yet connected with the processors via a P2P interconnect, such that either or both processors' local cache information, including for example, copies of drivers 512, 515, 542 and 545, may be stored in the shared cache if a processor is placed into a low power mode. Chipset 590 may also exchange data with I/O devices 537 and audio I/O devices 504 via a bus interface 514. In some embodiments of system 501, I/O devices 537 and audio I/O devices 504 may be combined hardware firmware devices similar to device(s) 502 and capable also to implement a virtualizable and forward-compatible device-driver/function-driver interface as described above. Chipset 590 may also exchange data with interfaces 562 and 566, keyboard/mouse 534, communications devices 532, bios 540 and data storage 519 via bus interface 514, bus bridge 521 and a bus interface 518. In some embodiments of system 501, one or more of keyboard/mouse 534, communications devices 532, data storage 519 and bus bridge 521 may also be combined hardware firmware devices similar to device(s) 502 and capable to implement a virtualizable and forward-compatible device-driver/function-driver interface as described above. In some embodiments of system 501, interfaces 562 and 566 may be blade expansion connectors for connecting to high speed Serializer/Deserializer (SerDes) Fabric interfaces.

Embodiments of the disclosed techniques may be included in or applied to any hardware and/or firmware device or portion thereof, including central processing units, graphics processing units, network processors, or other processing logic or cores within a processor or in a computer system. Embodiments may also be embodied in a tangible machine readable medium having stored there on a set of instructions which if performed by a machine causes the machine to perform operations described herein.

Figure 6:
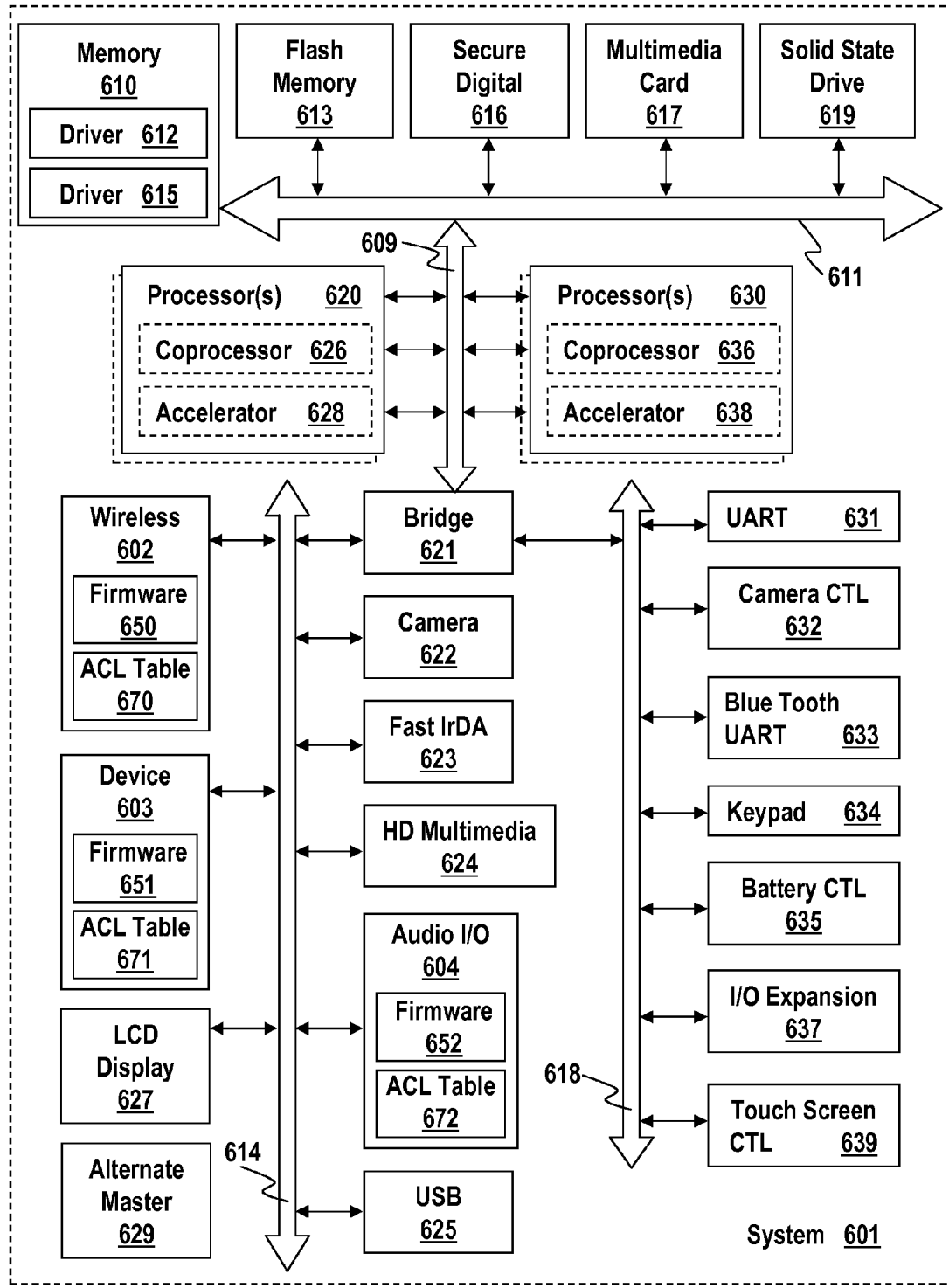
FIG. 6 illustrates an alternative embodiment of a system that utilizes a virtualizable and forward-compatible device-driver/function-driver interface with a combined hardware firmware device.

FIG. 6 illustrates an alternative embodiment of a system 601 that utilizes a virtualizable forward-compatible device-driver/function-driver interface with a combined hardware firmware device. System 601 comprises processors 620 and 630 optionally having one or more coprocessors 626 and 636 respectively and one or more accelerators 628 and 638 respectively, memory 610, wireless connectivity device 602, device 603 (which may be, for example, an Ethernet device or a fourth generation modem device), and audio I/O devices 604. In some embodiments of system 601, wireless connectivity device 602 includes firmware 650 and ACL table 670, device 603 includes firmware 651 and ACL table 671, and audio I/O devices 604 include firmware 652 and ACL table 672. Some embodiments of system 601 may be implemented as a system on a chip, for example, to use in a tablet computer or a smart phone. In such embodiments wireless connectivity device 602 may provide a wireless LAN (local area network) link capable of implementing a virtualizable and forward-compatible device-driver/function-driver interface, device 603 may provide a 4G (fourth generation), 5G (fifth generation) or later telephone link capable of implementing a virtualizable and forward-compatible device-driver/function-driver interface, and audio I/O devices 604 may provide a set of audio human interface devices, for example, a headset, speakers, handset microphone, audio input and output channels, and amplifiers, which are capable of implementing a virtualizable and forward-compatible device-driver/function-driver interface.

Processors 620 and 630 are coupled with bus 609, bridge 621 and bus 614 for communicating with various other system devices, which may include but are not limited to wireless connectivity device 602, device 603, and audio I/O devices 604, camera 622, Fast IrDA (Infrared Data Association) port 623, HD (high definition) multimedia interface 624, USB 625, LCD (liquid crystal display) device 627, and alternate master interface 629. In some embodiments of system 601, one or more of camera 622, Fast IrDA port 623, HD multimedia interface 624, USB 625, LCD device 627, and alternate master interface 629 may also be, or connect to devices capable of implementing a virtualizable and forward-compatible device-driver/function-driver interface.

Processors 620 and 630 are also coupled with bus 609 and bus 611 for communicating with various other system devices, which may include but are not limited to memory 610, flash memory 613, SD (secure digital) memory 616, MMC (multimedia card) 617 and SSD (solid state drive) 619. Memory 610 and other tangible storage media of system 601 may record functional descriptive material including executable instructions of driver 612 and driver 615, and of other device drivers (not shown) which may be executed by processor 620 or by processor 630 to implement, at least in part, a virtualizable and forward-compatible device-driver/function-driver interface, for example, as described above.

Drivers 612 and 615 may be function drivers which provide specific functions to a device driver for any one of wireless connectivity device 602, device 603, or audio I/O devices 604. Driver 612 and 615 may be physical drivers or virtualized drivers or some of both. In one embodiment of system 601, one of driver 612 or driver 615 may be considered a privileged driver (without loss of generality, say driver 615). If the executable instructions of driver 612 and/or of driver 615 are executed by processor 620 or by processor 630 they may cause the system 601 to perform one or more processes to implement a virtualizable and forward-compatible device-driver/function-driver interface with one of combined hardware firmware devices, wireless connectivity device 602, device 603, or audio I/O devices 604.

Processors 620 and 630 are coupled with bus 609, bridge 621 and bus 614 for communicating with various other system devices, which may include but are not limited to UART (universal asynchronous receiver/transmitter) 631, camera control 632, Blue Tooth UART 633 optionally including a Wi-Fi 802.11 a/b/g transceiver and/or a GPS (Global Positioning System) transceiver, keypad 634, battery control 635, I/O expansion 637 and touch screen control 639. In some embodiments of system 601, one or more of UART 631, camera control 632, Blue Tooth UART 633, keypad 634, battery control 635, I/O expansion 637 and touch screen control 639 may also be, or connect to devices capable of implementing a virtualizable and forward-compatible device-driver/function-driver interface.

Some embodiments of system 601 may adhere to industry virtualization standards which allow multiple operating systems running simultaneously within a single computer to natively share devices like SRIOV, which provides native I/O virtualization in PCI Express topologies, or MRIOV, which provides native I/O virtualization in topologies where multiple root complexes share a PCI Express hierarchy. Some embodiments of system 601 may include standard or non-standard or proprietary virtualization technologies, interfaces, busses or interconnects such as the SPI bus, USB, AMBA APB; FireWire, HDMI, Mini DisplayPort, MIPI SLIMbus, MIPI LLI, MIPI CSI, MIPI DSI, etc. It will be appreciated that through use of such technologies, it may already be possible to, or enhancements may be possible that permit such technologies to implement and utilize a virtualizable and forward-compatible device-driver/function-driver interface with a combined hardware firmware device in accordance with embodiments of techniques herein disclosed.

The above description is intended to illustrate example embodiments. From the discussion above it should also be apparent that especially in such an area of technology, where growth is fast and further advancements are not easily foreseen, these embodiments may be modified in arrangement and detail by those skilled in the art without departing from the principles herein disclosed within the scope of the accompanying claims and their equivalents.

What is claimed is:

1. An I/O apparatus comprising a non-transitory machine-readable medium to record functional descriptive material, which if accessed by a machine causes the machine to:
   queue a plurality of commands, from a first function driver that is either one of a physical function driver or a virtual function driver, into a first command queue;
   fetch a first command of the plurality of commands from the first command queue to a device firmware in the I/O apparatus;
   access an actions table stored on the I/O apparatus with the device firmware to determine a type of action, through which the first function driver is permitted to perform the first command;
   wherein upon determining the type of action, through which the first function driver is permitted to perform the first command, if the type of action is a correction, said functional descriptive material further causes the machine to:
   trap the first command;
   correct the first command to generate a corrected command; and
   queue a first event from the device firmware into a first event queue responsive to the first command.

2. The I/O apparatus of claim 1 wherein upon determining the type of action, through which the first function driver is permitted to perform the first command, said functional descriptive material further causes the machine to:
   forward the first command as a second event to a second event queue for a privileged function driver;
   queue a second command from the privileged function driver into a second command queue;
   fetch the second command from the second command queue to the device firmware;
   access the actions table with the device firmware to determine if the privileged function driver is permitted to perform the second command;
   execute the second command; and
   queue a third event from the device firmware into the second event queue responsive to the second command.

3. The I/O apparatus of claim 1 wherein the non-transitory machine-readable medium records functional descriptive material, which if accessed by the machine further causes the machine to:
   execute the corrected command;
   simulate completion of the first command; and
   queue the first event into the first event queue for the first function driver responsive to the simulated completion of the first command.

4. The I/O apparatus of claim 1 upon wherein determining the type of action, through which the first function driver is permitted to perform the first command, the first function driver is permitted to perform the first command with assistance from the device firmware, said functional descriptive material further causes the machine to:
   forward the first command; and
   correct the first command with the device firmware to generate the corrected command.

5. The I/O apparatus of claim 4 wherein the non-transitory machine-readable medium records functional descriptive material, which if accessed by the machine further causes the machine to:
   execute the corrected command;
   simulate completion of the first command; and
   queue the first event from the device firmware into the first event queue for the first function driver responsive to the simulated completion of the first command.

6. The I/O apparatus of claim 1 wherein the non-transitory machine-readable medium records functional descriptive material, which if accessed by the machine further causes the machine to:
   modify the actions table responsive to the first command.

7. A method for using one I/O device interface in a first function driver that is either one of a physical function driver or a virtual function driver, the method comprising:
   queuing a plurality of commands from the first function driver into a first command queue;
   fetching a first command of the plurality of commands from the first command queue to a device firmware;
   accessing an actions table with the device firmware to determine if the first function driver is permitted to perform the first command, and determining that the first function driver is not permitted to perform the first command;
   forwarding the first command as a first event to a first event queue for a privileged function driver;
   queuing a second command from the privileged function driver into a second command queue;
   fetching the second command from the second command queue to the device firmware;
   accessing the actions table with the device firmware to determine if the privileged function driver is permitted to perform the second command, and determining that the privileged function driver is permitted to perform the second command;
   executing the second command;
   queuing a second event from the device firmware into the first event queue responsive to the second command; and
   queuing a third event from the device firmware into a second event queue for the first function driver responsive to the first command.

8. The method of claim 7 further comprising:
   simulating completion of the first command; and
   queuing the third event from the device firmware into the second event queue for the first function driver responsive to the simulated completion of the first command.

9. The method of claim 8 performed by a system comprising:
   a processor;
   a memory coupled with the processor to store the first device driver and the privileged driver;
   a network interface device coupled with the processor,
   the network interface device including the device firmware and the actions table.

10. A method for using an I/O device interface, the method comprising:
    installing a first device driver having one or more virtualized functions to be identified by a device firmware accessing an actions table;
    installing a privileged driver to proxy execution of at least one command for the one or more virtualized functions;
    queuing a plurality of commands from the first function driver into a first command queue;

fetching a first command of the plurality of commands from the first command queue to said device firmware;

accessing an actions table with the device firmware to determine if the first function driver is permitted to perform the first command;

trapping said at least one command; and forwarding the trapped command to the privileged driver; and queuing a first event from the device firmware into a first event queue responsive to the first command.

11. The method of claim 10 further comprising:

receiving the forwarded command;

executing a privileged command on behalf of the first device driver; and simulating completion of the forwarded command.

12. The method of claim 11 performed by a system comprising:

a processor;

a memory coupled with the processor to store the first device driver and the privileged driver;

a network interface device coupled with the processor, the network interface device including the device firmware and the actions table.

13. A non-transitory machine-readable medium to record executable instructions, which if executed by a machine cause the machine to:

queue a plurality of commands into a first command queue;

fetch one or more commands of the plurality of commands from the first command queue to a device firmware in an I/O device;

access an actions table stored on the I/O device with the device firmware to determine if the one or more commands are permitted;

install a first device driver having one or more virtualized functions to be identified by the device firmware accessing said actions table;

install a privileged driver to proxy execution of at least one command for the one or more virtualized functions trap said at least one command; and forward the trapped command to the privileged driver.

14. The non-transitory machine-readable medium of claim 13 further including executable instructions, which if executed by a machine cause the machine to:

receive the forwarded command;

execute a privileged command on behalf of the first device driver; and simulate completion of the forwarded command.

15. The non-transitory machine-readable medium of claim 13 further including executable instructions, which if executed by a machine cause the machine to:

access the actions table stored on the I/O device with the device firmware to determine if the first device driver is permitted to perform the one or more commands, and if said accessing of the actions table determines that the first device driver is not permitted to perform the one or more commands, then further causing the machine to:

drop the one or more commands; and queue a first event into a first event queue to simulate completion of the one or more commands.

16. The non-transitory machine-readable medium of claim 13 further including executable instructions, which if executed by a machine cause the machine to:

access the actions table stored on the I/O device with the device firmware to determine if the first device driver is permitted to perform the one or more commands, and if said accessing of the actions table determines that the first function driver is only permitted to perform the one or more commands with assistance, then further causing the machine to:

trap the first command; and correct the first command to generate a corrected command.

17. The non-transitory machine-readable medium of claim 16 further including executable instructions, which if executed by a machine cause the machine to:

execute the corrected command;

simulate completion of the first command; and queue the first event into the first event queue for the first function driver responsive to the simulated completion of the first command.

* * * * *

UNITED STATES PATENT AND TRADEMARK OFFICE
CERTIFICATE OF CORRECTION

| | | |
|---|---|---|
| PATENT NO. | : 9,081,709 B2 | Page 1 of 1 |
| APPLICATION NO. | : 14/258966 | |
| DATED | : July 14, 2015 | |
| INVENTOR(S) | : Eliezer Tamir et al. | |

It is certified that error appears in the above-identified patent and that said Letters Patent is hereby corrected as shown below:

On the title page item (72), Inventors: Line 2
"Louzon" should be replaced with --Louzoun--

Signed and Sealed this
Thirty-first Day of May, 2016

Michelle K. Lee
*Director of the United States Patent and Trademark Office*